United States Patent [19]

Regan, deceased et al.

[11] Patent Number: 5,290,853
[45] Date of Patent: Mar. 1, 1994

[54] AMBIENT MOISTURE-CURING POLYURETHANE ADHESIVE

[75] Inventors: John F. Regan, deceased, late of St. Paul, by Mary B. Regan, legal representative; Benjamin E. Burrows, St. Louis Park, both of Minn.

[73] Assignee: ChemRex Inc., Milwaukee, Wis.

[21] Appl. No.: 757,834

[22] Filed: Sep. 11, 1991

Related U.S. Application Data

[63] Continuation-in-part of Ser. No. 538,788, Jun. 15, 1990, abandoned.

[51] Int. Cl.$^5$ .................... C08G 10/10; C08G 10/24
[52] U.S. Cl. ...................... 524/779; 524/265; 524/588; 524/780; 528/60; 528/66; 528/71; 528/73; 528/76
[58] Field of Search ............ 524/779, 588, 780, 265; 528/60, 66, 71, 73, 76

[56] References Cited

U.S. PATENT DOCUMENTS

| | | | |
|---|---|---|---|
| 4,687,533 | 8/1987 | Rizk et al. | 524/588 |
| 4,876,308 | 10/1989 | Melby et al. | 524/780 |
| 4,879,365 | 11/1989 | Petschke et al. | 528/73 |
| 4,952,621 | 8/1990 | Bandlish | 524/265 |
| 5,075,407 | 12/1991 | Cody et al. | 528/71 |

*Primary Examiner*—John Kight, III
*Assistant Examiner*—John M. Cooney, Jr.
*Attorney, Agent, or Firm*—Michael, Best & Friedrich

[57] ABSTRACT

One-part, ambient moisture-curable polyurethane adhesives are produced by reacting with a polyol selected from the group consisting of polyether diols, triols and tetrols based on propylene glycol or ethylene-capped propylene glycol and mixtures thereof with an organic polyisocyanate for a sufficient time to form a reaction product including an isocyanate-terminated prepolymer and unreacted isocyanate, admixing with the reaction product talc or another additive containing free water which reacts with the unreacted isocyanate to extend the chain of the polyurethane and provide hard segments therein, allowing the water-isocyanate reaction to proceed until a predetermined amount of unreacted isocyanate remains and introducing the resulting adhesive into a substantially hermetically sealed container or package.

33 Claims, No Drawings

AMBIENT MOISTURE-CURING POLYURETHANE ADHESIVE

CROSS REFERENCE TO RELATED APPLICATION

This is a continuation-in-part of co-pending application Ser. No. 538,788, filed Jun. 15, 1990, now abandoned.

BACKGROUND OF THE INVENTION

1. Field of the Invention

This invention relates to one-part polyurethane adhesives which are curable upon exposure to ambient moisture and to methods for making same.

One-part polyurethane adhesives typically are produced by reacting a polyether diol, triol, tetrol or mixtures thereof with a polyisocyanate, with or without a catalyst, in a reactor for up to eight hours to produce an isocyanate-terminated prepolymer. Various additives are blended with the prepolymer to provide a product having the desired characteristics and the resulting product is packaged in substantially hermetically sealed containers for use.

II. Prior Art

Because of the reactivity of water with isocyanates, it is common practice to take steps to avoid the inclusion of water during processing. To accomplish this, the processing is typically carried out in a sealed container under a blanket of inert gas, such as nitrogen, and fillers and other materials used in the formulation are dried to a substantially anhydrous condition prior to use. In another approach exemplified by Coyner et al. U.S. Pat. Nos. 3,919,173 and 4,038,239, an alkaline earth metal oxide, such as calcium oxide or calcium carbonate, is included in the formulation as a de-watering agent for scavenging water from the polyol and water of hydration or physically bound water in fillers, plasticizers, pigments, etc.

SUMMARY OF THE INVENTION

An object of the invention is to provide a one-part, moisture-curable polyurethane adhesive having improved properties.

Another object of the invention is to provide such a polyurethane adhesive including a polyurethane molecule having relatively hard segments and relatively soft segments.

A further object of the invention is to provide a simple, inexpensive process for producing such polyurethane adhesives.

A still further object of the invention is to provide such a process which does not require drying of various additives blended with a polyurethane prepolymer.

Other objects, aspects and advantages of the invention will become apparent to those skilled in the art upon reviewing the following detailed description and the appended claims.

In accordance with the invention, a one-part, ambient moisture-curable polyurethane adhesive which is dispensed for use from a substantially hermetically sealed container is produced by reacting about 30 to about 50 weight % of a polyol selected from the group consisting of polyether diols, triols and tetrols based on propylene glycol or ethylene oxide-capped propylene glycol and mixtures thereof and having an average molecular weight of about 1000 to about 10,000 with an organic polyisocyanate having a functionality greater than 2, at a ratio of isocyanate equivalents to polyol equivalents of about 3:1 to about 15:1, for a sufficient time to form a polyurethane reaction product including an isocyanate-terminated prepolymer and unreacted isocyanate (polyol-isocyanate reaction); admixing with the resulting reaction product at least one additive selected from the group consisting of thixotropic agents, fillers, antioxidants, plasticizers, solvents, pigments, adhesive promoters, UV stabilizers and defoaming agents containing a sufficient total amount of free water to provide a ratio of water equivalents to polyol equivalents of about 0.2:1 to about 2:1, whereby the free water reacts with unreacted isocyanate in the reaction product to extend the molecular chain of said polyurethane and provide hard segments therein (water-isocyanate reaction); allowing the water-isocyanate reaction to proceed until a predetermined amount of unreacted isocyanate remains to produce an isocyanate-terminated polymer adhesive containing unreacted isocyanate; and introducing the resulting adhesive into a substantially hermetically sealed container.

The polyol preferably is a diol having an average molecular weight of about 1000 to about 8000, a triol having an average molecular weight of about 1000 to about 10,000, or a mixture of such diols at a weight ratio of said triol to diol of about 4:1 to about 0.5:1. The polyisocyanate preferably has a functionality of about 2.2 to about 2.5 and the isocyanate equivalents to polyol equivalents ratio preferably is about 5:1 to about 10:1. The free water preferably is introduced by talc, preferably having a moisture content of about 0.5 to about 2%, and the amount of talc preferably is about 5 to about 40 weight %.

DESCRIPTION OF THE PREFERRED EMBODIMENTS

The polyols used to produce one-part, ambient moisture-curable polyurethane adhesives of the invention are polyether diols, triols and tetrols based on propylene glycol and mixtures of these polyethers. Polyols containing primarily secondary hydroxyl groups are preferred because the resulting polyurethane adhesive has superior hydrolytic stability (i.e., resistance to attack by water). Polyether diols, triols and tetrols based on propylene glycol and end capped with ethylene oxide can be used; however, they are less desirable for some applications because the resulting polyurethane adhesive has a somewhat reduced hydrolytic stability.

The molecular weight and functionality of the polyols are selected to provide an adhesive having a manageable viscosity for application and the desired hydrolytic stability, tear strength, flexibility and tensile strength. A polyol having an average molecular weight higher than about 10,000 produces an adhesive having an unmanageable viscosity. Thus, the average molecular weight of the polyol or mixture of polyols should be about 1000 to about 10,000, preferably about 2000 to about 8000. When only a diol is used, the average molecular weight should be about 1000 to 8000, preferably about 2000 to about 6000 and most preferably about 4000. Diols having an average molecular weight within the preferred range produce a polyurethane adhesive having good hydrolytic stability. When only a triol is used, the average molecular weight should be about 1000 to about 10,000, preferably about 2500 to about 8000 and most preferably about 6000. Triols having an average molecular weight within the preferred range produce polyurethane adhesives having good hydrolytic stability, tear strength and flexibility.

When a mixture of diols and triols are used, the weight ratio of triol to diol should about 4:1 to about 0.5:1, preferably about 3:1 to about 1:1.

Polyols having the above characteristics are prepared in a well known manner and are commercially available. For example, suitable commercially available diols are POLY G 20-56 and POLY G 20-28 marketed by Olin Chemical, VORANOL 220-56 N and VORANOL 220-28 marketed by Dow Chemical and PLURACOL 1027 marketed by BASF Wyandotte. Suitable commercially available triols include POLY G 30-42 and POLY G 30-28 marketed by Olin Chemical and PLURACOL TP 440 marketed by BASF Wyandotte.

The amount of polyol used typically is about 30 to about 50, preferably about 35 to about 45, weight %, based on the total weight of the adhesive.

The polyisocyanate can be aromatic, aliphatic or cycloaliphatic and has an average functionality greater than 2. Polyisocyanates having a functionality of about 2.2 to about 2.5 are preferred because they provide the desired cross-linked density in the adhesive when it cures following application. Also, polyisocyanates having a free isocyanate value of about 30 to about 32% are preferred.

Suitable polyisocyanates include diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate (MDI), 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate; the triisocyanates such as 4,4', 4'-triphenylmethane triisocyanate, polymethylene polyphenylisocyanate and toluene, 2,4,6-triisocyanate; and the tetraisocyanates, such as 4,4'-dimethyldiphenylmethane-2,2'-5, 5'-tetraisocyanate.

Polymeric MDI, such as PAPI 2094 marketed by Dow Chemical and RUBINATE M marketed by ICI, are preferred polyisocyanates.

The polyol is reacted with an excess of polyisocyanate so that a reaction product containing an isocyanate-terminated polyurethane prepolymer and unreacted isocyanate is produced. The amount of polyisocyanate used is sufficient to provide a ratio of isocyanate equivalence to polyol equivalence of about 3:1 to about 15:1, preferably about 5:1 to about 10:1. The particular ratio used depends primarily on the desired flexibility characteristics of the adhesive, with flexibility decreasing as this ratio increases. It has been found that, when a polymeric MDI having a functionality of about 2.2-2.5 and a free isocyanate value of 31-32% is used with a diol having an average molecular weight of about 4000 or a triol having an average molecular weight of about 6000, a ratio of isocyanate equivalents to polyol equivalents of about 8:1 produces an adhesive exhibiting good tensile strength, while maintaining excellent adhesive properties.

The amount of polyisocyanate usually is about 10 to about 30, preferably about 15 to about 25, weight %, based on the total weight of the adhesive.

One or more conventional catalysts capable of accelerating the isocyanate-polyol reaction can be used, including tertiary amines, organo metallic compounds and mixtures thereof.

Suitable tertiary amines include triethylenediamine, dimethylethanolamine, triethanolamine, N-ethymorpholine, N-methyldicyclohexylamine, N,N-dimethyl cycolhexylamine, N,N,N',N'-tetramethyl-1,3-butanediamine, ether and the like.

Suitable organo metallic compounds include tin compounds such as stannous octoate, stannous chloride, dibutyltin dilaurate, dibutyltin diacetate, dibutyltin-di-2 ethyl hexoate and the like. Other suitable organo metallic compounds include bismuth octoate, zinc octoate and the like.

The amount of catalysts used usually is about 0.01 to about 1.0, preferably about 0.05 to about 0.3, weight %, based on the total weight of the adhesive. A complexing agent capable of reacting with the catalyst to slow down its reactivity after the adhesive has been packaged can be used. Diethyl malonate is particularly suitable for this purpose. When used, the amount of the complexing agent usually is about 0.05 to about 1.0, preferably about 0.1 to about 0.5, weight %, based on the total weight of the adhesive.

To reduce the reactivity of the adhesive after packaging and before use, the pH preferably is adjusted to about 6 to about 8, preferably about 6.5 to about 7.0. A suitable acid or other acidic compound which does not adversely interfere with the isocyanate-polyol reaction, or adversely affect the desired physical and chemical properties of the resulting adhesive, can be used for this purpose. Phosphoric acid is particularly suitable as a pH adjustment agent. When used, the amount of the pH adjustment agent usually is about 0.005 to about 0.05, preferably about 0.001 to about 0.01, weight %, based on the total weight of the adhesive.

One or more other conventional additives which are compatible with the isocyanate-terminated prepolymer and known to impart various physical properties to the resulting adhesive are added to the isocyanate-polyol reaction mixture. Suitable additives include thixotropic agents, fillers, antioxidants, plasticizers, solvents, pigments, adhesive promoters, UV stabilizers, defoaming agents and the like. In accordance with the invention, one or more of these additives includes a sufficient amount of total free moisture to provide a ratio of water equivalents to polyol equivalents of about 0.2:1 to about 2:1, preferably about 0.5:1 to about 1:1. The unreacted isocyanates in the isocyanate-polyol reaction mixture react with the free water introduced by the additive(s) to form an amine which reacts with another isocyanate to form urea which provides chain elongation of the prepolymer polyurethane molecule and introduces relatively hard segments into the molecule.

The total amount of such additives usually is about 10 to about 50, preferably about 25 to about 40, weight %, based on the total weight of the adhesive.

Various suitable thixotropic agents and/or fillers can be used, including talc, hydrophobic silica, hydrophilic silica, modified castor oils, precipitated calcium carbonate, asbestos and the like. In accordance with a preferred embodiment of the invention, substantially all the free moisture required to provide the desired urea formation is introduced with a powdered talc capable of acting both as a filler and a thixotropic agent. Talc is preferred for this purpose because of its high loading level, capability of carrying the desired amount of free moisture, ease of adjusting the free moisture content thereof, low cost and capability to absorbing oils.

When talc is used as the sole or primary source of water added to the isocyanate-polyol reaction product, the free water content thereof usually is about 0.25 to about 1.5%, preferably about 0.5 to about 1.0%. Also, the talc preferably has an oil absorptivity of about 30 to about 50, as measured by ASTM D-28, most preferably about 40.

When talc is used as the thixotropic agent/filler, the amount is about 5 to about 40, preferably about 10 to about 30, weight %, based on the total weight of the adhesive.

Various suitable plasticizers which preferably are noncombustible, have a relatively low viscosity and are compatible with the urethane matrix can be used. The plasticizer most preferably is a primary type having a high compatibility. While not necessarily required, a suitable solvent can be used to aid processing and/or as a diluent. In some cases the plasticizer can function both as a plasticizer and a solvent. Suitable plasticizers include nonvolatile organic liquids and low-melting solids, such as hydrogenated petroleum distillates, coal tar distillates, and other organic liquids having a boiling point higher than 30° C., phthalates (e.g., diisodecyl phthalate and dioctyl phthalate) and adipates (e.g., 2-ethyl hexyl adipate). Other materials conventionally used as a plasticizer and/or solvent in polyurethane adhesive formulations, such as methylene chloride, naphthol spirits, toluene and mixed spirits, can be used, but are less preferred.

When used, the amount of plasticizer/solvent is about 5 to about 15, preferably about 8 to about 12, weight %, based on the total weight of the adhesive.

An antioxidant can added to improve the long term oxidation resistance of the adhesive. When used, the amount of antioxidant usually is about 0.3 to about 1.0 weight %, based on the total weight of the adhesive. Various suitable commercially available antioxidants can be used, such as LOWINOX 44B25, a 4,4'-butylidene-bis[2-(1,1-dimethyethyl)-5-methylphenol]marketed by Lowi Chemical. Small amounts of an adhesive promoter, such as epoxy silanes marketed by Union Carbide, can be added to improve adhesion to metal or mineral filled substrates. Small amounts of a defoaming or bubble breaking agent can be added as a processing aid, both during processing and application of the adhesive, to minimize the build up of gas bubbles resulting from the water-isocyanate reaction.

A representative formulation of a one-part, ambient moisture-curing polyurethane adhesive of the invention is listed in Table 1 below.

TABLE 1

| Adhesive Formulation | |
|---|---|
| Ingredient | Weight %, Total Weight of Adhesive |
| Polyol[1] | 38.727 |
| MDI (polyisocyanate)[2] | 21.186 |
| Dibutytin Dilaurate (catalyst) | 0.085 |
| Diethyl Malonate (complexing agent) | 0.254 |
| Phosphoric Acid (inhibitor) | 0.004 |
| Plasticizer[3] | 0.508 |
| Antioxidant[4] | 9.576 |

TABLE 1-continued

| Adhesive Formulation | |
|---|---|
| Ingredient | Weight %, Total Weight of Adhesive |
| Talc[5] | 29.66 |

Notes:
[1]PLURACOL 1027, a diol/triol mixture having an average molecular weight of 4000, marketed by BASF Wyandotte.
[2]PAPI 2094, polymeric MDI marketed by Dow Chemical.
[3]Exxon D110 Solvent, a hydrogenated petroleum distillate marketed by Exxon.
[4]LOWINOX 44B25, a 4,4'-butylidene-bis[2-(1,1-dimethethyl)-5-methylphenol] marketed by Lowi Chemical.
[5]MISTRON VAPOR, powdered talc containing about 0.5% of free water marketed by Cypress Minerals.

In a preferred process for producing such an adhesive, the polyisocyanate is introduced into a covered mixing vessel or tank and the polyol is added to the polyisocyanate with mixing under an atmosphere of dry gas, such as nitrogen. The complexing agent (diethyl malonate), inhibitor (phosphoric acid), catalyst and antioxidant are added with mixing under a dry nitrogen blanket and the resulting mixture is mixed for approximately 1.5 to 2 hours to form a reaction mixture containing an isocyanate-terminated prepolymer and unreacted isocyanate.

The plasticizer and powdered talc are then added with mixing. When a high oil absorptivity talc is used in accordance with a preferred embodiment, the talc initially gives body and thixotropy to the system. The free water in the talc begins to react with unreacted isocyanate to form urea and provide chain elongation and hard segments to the polyurethane as described above. The mixing is continued until there is no visible unwetted talc. A vacuum is then applied to the tank and the mixture is mixed under a vacuum to allow the water-isocyanate reaction to proceed until a predetermined amount of unreacted isocyanate remains in the reaction mixture. Various end points can be used for this parameter. For example, for an adhesive having a final viscosity of 12,000 poise, the water-isocyanate reaction can be allowed to proceed until the viscosity of the resulting adhesive reaches an intermediate level, e.g., 40,000–60,000 centipoises, which is more manageable for packaging. For an adhesive having a formulation like that listed in Table 1, the water-isocyanate reaction can be allowed to proceed from about 30 minutes to 1 hour after mixing of the talc has completed.

After the water-isocyanate reaction has proceeded to the desired degree, the tank is purged with nitrogen to provide an inert atmosphere for dispensing the resulting adhesive into suitable substantially hermetically sealed packaging, such as cans, drums, plastic or cardboard tubes including a spout through which the adhesive is dispensed for use. As used herein, the term "substantially hermetically sealed" means a container or package designed to minimize the ingress of water vapor, ambient air and other moisture-containing gases after the adhesive has been placed in the container or package and the container or package sealed. It does not necessarily mean that the container or package completely prohibits ingress of such gases.

The water-isocyanate reaction continues for some time in the package and viscosity of the adhesive increases to the desired level. When the adhesive is exposed to ambient air at the time of end-use application, it cures by virtue of the moisture in the air reacting with the terminal isocyanate groups.

The polyurethane adhesive provided by the invention includes a combination of relatively hard segments (produced by the water-isocyanate reaction) which increases the polymer strength and relatively soft segments (produced by the isocyanate-polyol reaction). These segments can be varied to provide different properties. For example, the hard segments can be varied by varying the amount of polyisocyanate used, and thereby vary the amount of unreacted isocyanate after the isocyanate-polyol reaction, and the amount of water introduced into the reaction mixture by talc or other additives. The soft segments can be varied by the molecular weight and functionality of the polyol or mixtures of polyols used. The water-isocyanate reaction incorporates more hydrogen bond sites than is the case with adhesives prepared with dry fillers and thereby increases bonding to polar substrates.

The process of the invention is less costly because talc and other additives do not have to be dried, the overall time for the isocyanate-polyol and water-isocyanate reactions is less than that typically required for the isocyanate-polyol reaction in conventional processes using dried fillers and additives, and the chain extension provided by the water-isocyanate reaction permits a reduction in the amount of polyol required to obtain the same molecular weight.

It has been found that adhesives of the invention provide superior bonding when used to bond together water-soaked surfaces and retain a relatively high bond strength after parts bonded together thereby are immersed in water for a prolonged time. The adhesive can be used for bonding together a wide variety of materials such as plywood to structoglas, plywood to plexiglass, wood to wood PVA-mirror glass to shiny furniture wood and styrofoam and other foam material to a variety of substrates.

From the foregoing description, one skilled in the art can easily ascertain the essential characteristics of the invention and, without departing from the spirit and scope thereof, make various changes and modifications to adapt the invention to various usages and conditions.

I claim:

1. A process for making a one part, ambient moisture-curable polyurethane adhesive which is dispensed for use from a substantially hermetically sealed container, said process including the steps of reacting about 30 to about 50 weight %, based on the total weight of the adhesive, of a polyol selected from the group consisting of polyether diols, triols and tetrols based on propylene glycol or ethylene oxide-capped propylene glycol and mixtures thereof and having an average molecular weight of about 1000 to about 10,000, with an organic polyisocyanate having a functionality greater than 2, at a ratio of isocyanates equivalents to polyol equivalents of about 3:1 to about 15:1, for a sufficient time to form a polyurethane reaction product including an isocyanate-terminated prepolymer and unreacted isocyanate (polyol-isocyanate reaction);

admixing with said reaction product at least one additive selected from the group consisting of thixotropic agents, fillers, antioxidants, plasticizers, solvents, pigments, adhesive promoters, UV stabilizers and defoaming agents, said additive containing a sufficient amount of total free water to provide a ratio of water equivalents to polyol equivalents of about 0.2:1 to about 2:1, whereby said free water reacts with unreacted isocyanate in said reaction product to extend the molecular chain of said polyurethane and provide hard segments therein (water-isocyanate reaction);

allowing said water-isocyanate reaction to proceed until a predetermined amount of unreacted isocyanate remains to produce an isocyanate-terminated polymer adhesive containing unreacted isocyanate; and introducing the resulting adhesive into a substantially hermetically sealed container.

2. A process according to claim 1 wherein said polyol is a diol having an average molecular weight of about 1000 to about 8000, a triol having an average molecular weight of about 1000 to about 10,000, or a mixture of said diol and triol at a weight ratio of triol to diol of about 4:1 to about 0.5:1.

3. A process according to claim 1 wherein
said polyisocyanate has a functionality of about 2.2 to about 2.5; and
said ratio of isocyanate equivalents to polyol equivalents is about 5:1 to about 10:1.

4. A process according to claim 3 wherein said polyisocyanate is a polymeric MDI.

5. A process according to claim 4 wherein the amount of said polyisocyanate is about 10 to about 30 weight %, based on the total weight of the adhesive.

6. A process according to claim 5 wherein the amount of said polyisocyanate is about 15 to about 25.

7. A process according to claim 1 wherein said ratio of water equivalents to polyol equivalents is about 0.5:1 to about 1:1.

8. A process according to claim 1 wherein one of said additives is talc containing substantially all the free water required to provide said ratio of water equivalents to polyol equivalents.

9. A process according to claim 8 wherein said talc has a free moisture content of about 0.5 to about 2 weight % and the amount thereof is about 5 to 40 weight %, based on the total weight of the adhesive.

10. A process according to claim 9 wherein the amount of said talc is about 10 to about 30 weight %.

11. A process according to claim 1 including admixing with said polyol and said polyisocyanate a catalyst for catalyzing said polyol-isocyanate reaction.

12. A process according to claim 11 wherein the amount of said catalyst is about 0.1 to about 1.0 weight %, based on the total weight of the adhesive.

13. A process according to claim 12 wherein the amount of said catalyst is about 0.05 to about 0.3.

14. A process according to claim 12 wherein said catalyst an organo tin compound.

15. A process according to claim 14 including reacting with said polyol and polyisocyanate about 0.01 to about 1 weight %, based on the total weight % of the adhesive, of diethyl malonate.

16. A process according to claim 1 including admixing with said polyol and polyisocyanate a sufficient amount of an acidic compound to adjust the pH of said reaction mixture to about 5 to about 8.

17. A process according to claim 16 wherein said acid is phosphoric acid.

18. A product produced by the process of claim 1.

19. A process for making a one part, ambient moisture-curable polyurethane adhesive which is dispensed for use from a substantially hermetically sealed container, said process including the steps of reacting about 30 to about 50 weight %, based on the total weight of the adhesive, of a polyol selected from the group consisting of polyether diols based on propylene glycol or ethylene oxide-capped propylene glycol having a molecular weight of about 2000 to about 6000, triols based on propylene glycol or ethylene-capped propylene glycol having a molecular weight of about 2500 and about 8500 and mixtures thereof and with an organic polyisocyanate having a functionality greater than 2, at a ratio of isocyanates equivalents to polyol equivalents of about 5:1 to about 10:1, for a sufficient time to form a polyurethane reaction product including an isocyanate-terminated prepolymer and unreacted isocyanate (polyol-isocyanate reaction);

admixing with said reaction product at least one additive selected from the group consisting of thixotropic agents and fillers containing a sufficient amount of total free water to provide a ratio of water equivalents to polyol equivalents of about 0.2:1 to about 2:1, whereby said free water reacts with unreacted isocyanate in said reaction product to extend the molecular chain of said polyurethane and provide hard segments therein (water-isocyanate reaction);

allowing said water-isocyanate reaction to proceed until a predetermined amount of unreacted isocyanate remains to produce an isocyanate-terminated polymer adhesive containing unreacted isocyanate; and introducing the resulting adhesive into a substantially hermetically sealed container.

20. A process according to claim 19 wherein said ratio of water equivalents to isocyanate equivalents is about 0.5:1 to about 1:1.

21. A process according to claim 20 wherein said additive is talc containing all the free water to provide said ratio of water equivalents to isocyanate equivalents.

22. A process according to claim 21 wherein said talc has a free water content of about 0.5 to about 2 weight % and the amount thereof is about 5 to 40 weight %, based on the total weight of the adhesive.

23. A process according to claim 22 wherein said polyisocyanate is a polymeric MDI and has a functionality of about 2.2 to about 2.5.

24. A process according to claim 23 wherein the amount of said polyisocyanate is about 10 to about 30 weight %, based on the total weight of the adhesive.

25. A process according to claim 24 wherein the amount of said polyisocyanate is about 15 to about 25.

26. A process according to claim 23 including admixing with said polyol and said polyisocyanate a catalyst for catalyzing said polyol-isocyanate reaction.

27. A process according to claim 26 wherein said catalyst is an organo tin compound and the amount thereof is about 0.1 to about 1.0 weight %, based on the total weight of the adhesive.

28. A process according to claim 27 wherein the amount of said organo tin compound is about 0.05 to about 0.3.

29. A process according to claim 27 including reacting with said polyol and polyisocyanate about 0.01 to about 1 weight %, based on the total weight % of the adhesive, of diethyl malonate.

30. A process according to claim 28 including admixing with said polyol and polyisocyanate a sufficient amount of an acidic compound to adjust the pH of said reaction mixture to about 0.5 to about 7.

31. A product produced by the process of claim 19.
32. A product produced by the process of claim 23.
33. A product produced by the process of claim 30.

* * * * *

UNITED STATES PATENT AND TRADEMARK OFFICE
CERTIFICATE OF CORRECTION

PATENT NO.   :   5,290,853
DATED        :   March 1, 1994
INVENTOR(S)  :   John F. Regan, Deceased et al.

It is certified that error appears in the above-identified patent and that said Letters Patent is hereby corrected as shown below:

Column 7, line 46, "steps" should read ---step---;

Column 8, line 51, after "catalyst", insert ---is---.

Signed and Sealed this

Sixth Day of September, 1994

Attest:

BRUCE LEHMAN

Attesting Officer    Commissioner of Patents and Trademarks